United States Patent
Blackburn

(10) Patent No.: US 7,026,724 B1
(45) Date of Patent: Apr. 11, 2006

(54) METHOD FOR LIMITING CURRENT OF STARTER/ALTERNATOR IN GENERATOR MODE

(75) Inventor: Scott Evart Blackburn, Temperance, MI (US)

(73) Assignee: Dana Corporation, Toledo, OH (US)

( * ) Notice: Subject to any disclaimer, the term of this patent is extended or adjusted under 35 U.S.C. 154(b) by 260 days.

(21) Appl. No.: 10/206,936

(22) Filed: Jul. 30, 2002

(51) Int. Cl.
  *B60L 1/10* (2006.01)
(52) U.S. Cl. ............... 307/9.1; 307/10.1; 307/10.6; 307/10.8
(58) Field of Classification Search ............... 307/9.1, 307/10.1, 10.8, 10.6
  See application file for complete search history.

(56) References Cited

U.S. PATENT DOCUMENTS

| | | | |
|---|---|---|---|
| 4,346,341 A | * | 8/1982 | Blackburn et al. .......... 323/257 |
| 4,803,376 A | | 2/1989 | N'Guyen |
| 5,168,208 A | | 12/1992 | Schultz et al. |
| 5,663,632 A | | 9/1997 | Roseman et al. |
| 5,801,516 A | | 9/1998 | Rice et al. |

* cited by examiner

*Primary Examiner*—Robert L. DeBeradinis
(74) *Attorney, Agent, or Firm*—Liniak, Berenato, Longacre & White

(57) ABSTRACT

The system is directed to preserve the starter/alternator in an IC engine installation from potential overload and failure in response to electrical load increases. The system controller monitors starter/alternator output and phase current and regulates output voltage when monitored currents reach predetermined thresholds. Output voltage is stepped down incrementally to check output currents at threshold non-failure creating levels. When current demand, i.e., load, decreases, output voltage is stepped up incrementally to return to an original set point for voltage.

3 Claims, 2 Drawing Sheets

METHOD FOR LIMITING CURRENT OF STARTER/ALTERNATOR IN GENERATOR MODE

FIELD OF THE INVENTION

The invention relates to the field of automotive electrical systems. Specifically, the invention is directed to a method of limiting current supplied by a starter/alternator in the generator mode in the circumstance where a system malfunction has occurred and current demand placed on the generator has exceeded the load capacity of the starter/alternator.

BACKGROUND OF THE INVENTION

The trend in automotive electrical systems has always been towards more power and higher voltages. At this time, an element of the trend involves the combination of the alternator and starter into a single IC engine driven unit. This combined starter/alternator can be driven either directly on the crankshaft of the IC engine as a part of the flywheel on one end or the balancer on the other. Alternatively, the starter/alternator can be mounted for gear, belt, or chain drive from the crankshaft of other IC engine driven component (waterpump/A/C compressor/power steering pump, etc.)

The starter/alternator has become more powerful not only for increasing power (current and voltage) but also for more rapid and more frequent starting cycles of the IC engine as enhanced operating efficiencies are sought. In pursuit of these goals, the starter/alternator has become more sophisticated in its control systems and its responsiveness to system requirements for both starter functions and generating functions. In older fixed output generators (i.e., 1000 watts in a range of pre-selected engines speeds), the excess load would simply divert to the battery, or other electrical power storage device, similarly excess output would also divert. [Either of these eventualities led to either dimming lights and decreasing performance of electrical components, in the case of too small an alternator, or boiled away battery fluids in the case of too large a charging capacity!] However, in the event a starter/alternator is not controlled properly, the combined starter/alternator is generally sufficiently load responsive and powerful to either stall an IC engine, that is operating at low or idle speeds, or can also over speed itself in start up modes when the IC engine fails to attain self sustaining operation. And, even if neither of these circumstances occur, the starter/alternator responding to an increasing load can rapidly deliver too much current leading to overload and failure.

SUMMARY OF THE INVENTION

The present invention is directed to controlling the current output of a combined starter/alternator in response to demand loads such that the starter/alternator does not overload and fail. In this method, the current in the starter/alternator motor phases and/or the output current from the starter/alternator inverter is monitored. Once the monitored current reaches a predetermined threshold, the output voltage of the starter/alternator is regulated and reduced to maintain the output at the predetermined threshold level. Once the load demand decreases, the output voltage is increased back to the original set point.

DETAILED DESCRIPTION

Figure 1:
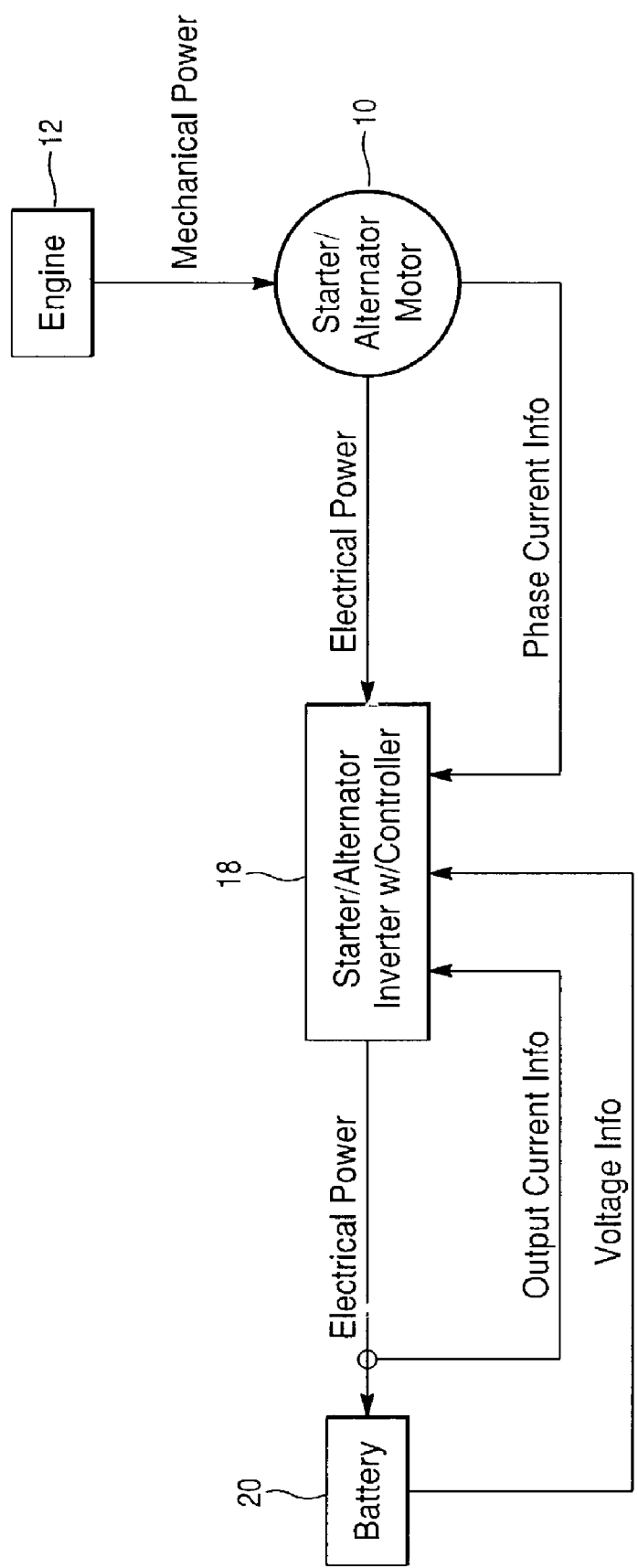
FIG. 1 shows a block diagram of the necessary sensors and hardware to accomplish the present method.
Figure 2:
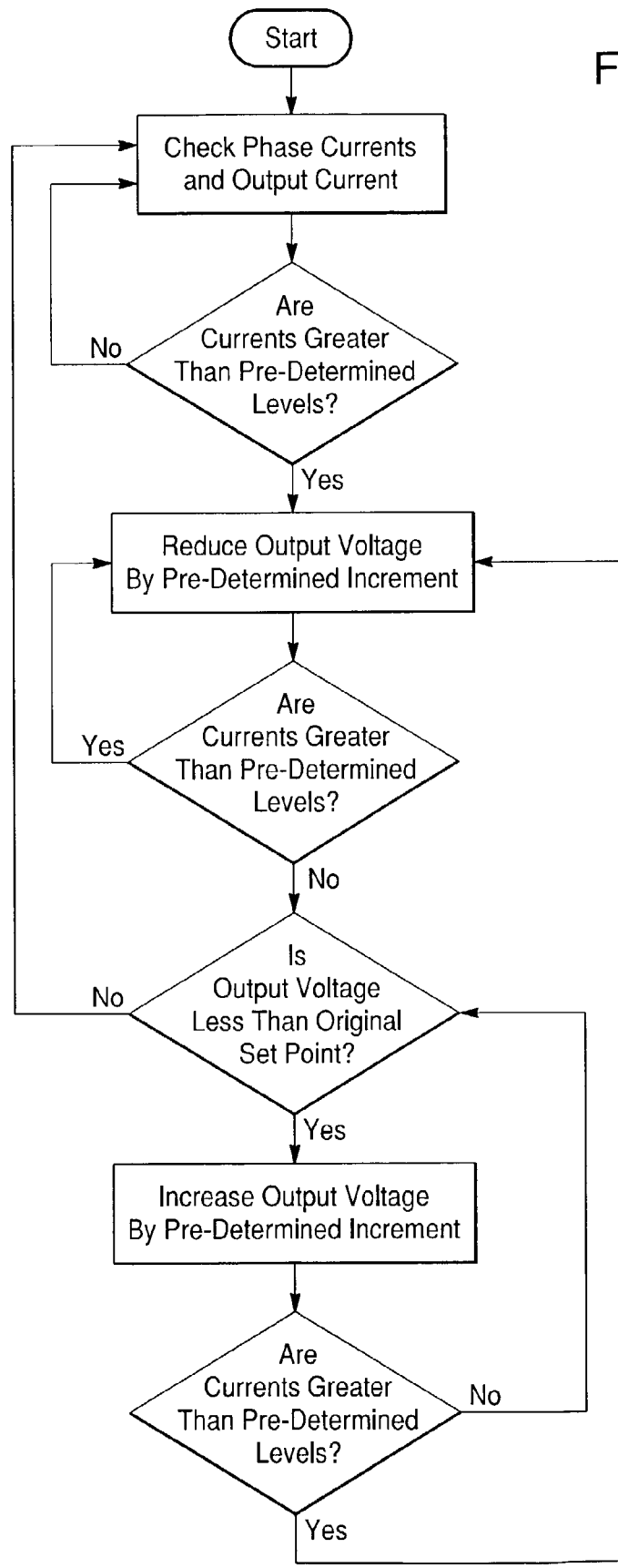
FIG. 2 shows a flow chart of decision making for the method used by the system controller in the present invention to determine threshold output current and to regulate and set associated output voltage to prevent starter/alternator overload.

The present invention is directed to a method of controlling a starter/alternator 10 associated with an IC engine 12. The starter/alternator 10 and IC engine 12 form a part of the motive system for a vehicle that has additional electrical components that create electrical load for the starter/alternator 10 to supply. The inverter/controller 18 controls the output of the starter/alternator as the output flows into the electrical system of the vehicle that also includes an electrical storage device 20 (battery).

In operation, the controller 18 monitors the phase currents and output current of the starter/alternator 10. As electrical load increases (i.e., A/C blowers switched to high for defrost and, at the same time, activating seat heaters, rear window heater, rear side view mirror heaters, and fast acting catalyst start-up heater), the output of the starter/alternator is increased by the controller accordingly. If the controller detects current exceeding a predetermined threshold, the output voltage is reduced by a predetermined increment, ie, 0.5 volts, the respective phase and output currents are again monitored to determine if they still exceed a predetermined threshold, if yes, the output voltage is again stepped down a predetermined amount.

Once the output and phase currents have been reduced and retained at an acceptable threshold, the output voltage is monitored and increased as the current demand decreases. I.e., as the catalyst quick start heater deactivates and the window and mirror heaters automatically cycle off after 3–5 minutes of operation. In response, the system controller 18 regulates the output voltage that is stepped incrementally back to the original set point for output voltage.

The method of the present invention can be activated in response to a rapidly increasing demand for electrical power created by load cycling into the system, or by heavy charging demands of a depleted storage device, or by a failed electrical component (shorted or other load generating malfunction). In any instance, and regardless of the reason, the starter/alternator is prevented from overloading and itself failing. In accordance with the present method the starter/alternator output voltage is regulated to keep output current from reaching beyond predetermined limits and thereby preserving the starter/alternator from overload failure.

I claim:

1. A method of preventing overload failure of a starter/alternator operating as a part of an electrical power system in an IC engine driven installation in a vehicle, said system including a battery, a starter/alternator, a starter/alternator inverter with controller, and an IC engine, comprising the steps of:

electrically loading said starter/alternator according to vehicle accessory electrical power demands;

monitoring at least one of phase current or output current of said starter/alternator in response to said electrical loading on said starter/alternator and obtaining a monitored current value;

comparing said monitored current value to predetermined overload failure threshold current values for said starter/alternator;

reducing output voltage of said starter/alternator when said monitored current value exceeds said predetermined overload failure threshold current value to keep said monitored current value at or below said predetermined threshold current value and maintain said starter/alternator in a power output operational mode;

repeating said monitoring, comparing, and reducing steps when said monitored current value continues to exceed said overload threshold value and, when said when said repeating step is no longer necessary; monitoring output voltage of said starter alternator to obtain an output voltage; and, increasing said output voltage if it is below a predetermined set point for output voltage.

2. A method as in claim 1, wherein:

said reducing step is accomplished using incremental drops in output voltage.

3. A method as in claim 1, wherein:

said increasing step is accomplished using incremental increases in output voltage.

\* \* \* \* \*